Aug. 7, 1934.   G. FUCHS ET AL   1,969,643
BEER COOLING AND DISPENSING APPARATUS
Filed Dec. 30, 1932   2 Sheets-Sheet 1

Patented Aug. 7, 1934

1,969,643

UNITED STATES PATENT OFFICE 1,969,643

BEER COOLING AND DISPENSING APPARATUS

Gottfried Fuchs and Hermann Späth, Stuttgart-Cannstatt, Germany

Application December 30, 1932, Serial No. 649,550
In Germany March 4, 1930

5 Claims. (Cl. 62—91.5)

This invention relates to an automatic cooling and pressure plant for beer conduits and cold storage rooms with employment of frozen carbon dioxide.

It is already known, to employ frozen carbon dioxide for cooling chill rooms. These plants, however, are open to the objection that the carbon dioxide becomes lost as soon as it is no longer frozen. This circumstance renders very questionable the economy of this cooling method, because, as is known, carbon dioxide is very expensive.

The invention relates to a plant, in which the gaseous carbon dioxide liberated by evaporation cools the chill room and also the beer conduit in the tapping device and at the same time serves as pressure medium for the beer in the barrel. The dry ice is accommodated in the cold storage room in a receptacle with insulated walls, from which vessel the gaseous carbon dioxide liberated by evaporation is conducted into the beer conduit cylinder through a cooling pipe conduit extending through the cold storage room. The beer conduit cylinder is surrounded by a jacket accommodating the cooling water. The gaseous carbon dioxide is conducted as pressure medium from the beer conduit cylinder in to the barrel. Posterior the receptacle accommodating the dry ice and anterior the cooling pipe conduit a known thermostat is arranged, by means of which the passage from the ice receptacle to the cooling pipe conduit is automatically regulated.

The jacket of the beer conduit is surrounded by a further jacket, the internal space of which is filled with cooling water which, owing to the expansion of the carbon dioxide in the cylinder, is cooled to freezing point, so that an ice jacket is formed around the beer conduit. The ice jacket is surrounded by a further jacket the internal space of which is filled with cooling water in order to protect the ice jacket against the external heat.

By means of this plant the dry ice is employed for three purposes, i. e. to cool the cold storage room and the beer conduit and to place under pressure the beer conduit, so that the dry ice is utilized in the most economical manner.

The plant also effects a considerable cooling of the beer which is sufficient even during the hottest season of the year.

Two embodiments of the invention are illustrated by way of example in the accompanying drawings in which.

Figure 1:
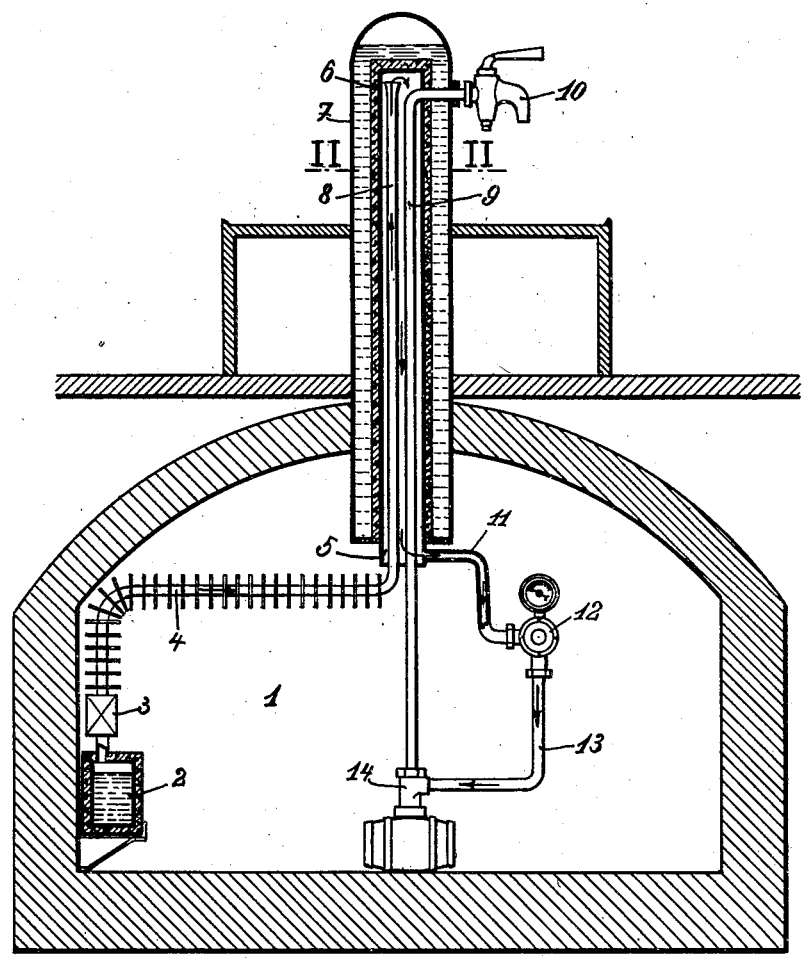
Fig. 1 shows the plant in vertical section.
Figure 2:
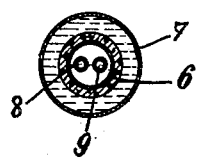
Fig. 2 is a cross-section through the cooling cylinder taken on line II—II of Fig. 1.

In a cold storage room 1 an insulated receptacle 2 is arranged. Above the receptable 2 a thermostat 3 is fitted, and from this thermostat 3 a cooling pipe conduit 4 leads to the cooling cylinder 5 for the beer riser pipes. This cooling cylinder 5 is covered by a suitable insulating material 6 and pushed into a cooling water cylinder 7 through which a carbon dioxide feed pipe 8 and a beer conduit riser pipe 9 extend. A tap 10 is fixed on the end of the beer riser pipe 9 and to the lower end of the cooling cylinder 5 a carbon dioxide discharge pipe 11 is connected and leads to a pressure reducing valve 12.

A pipe or hose 13 extends from the pressure reducing valve 12 to a screw connection 14 for tapping.

Figure 3:
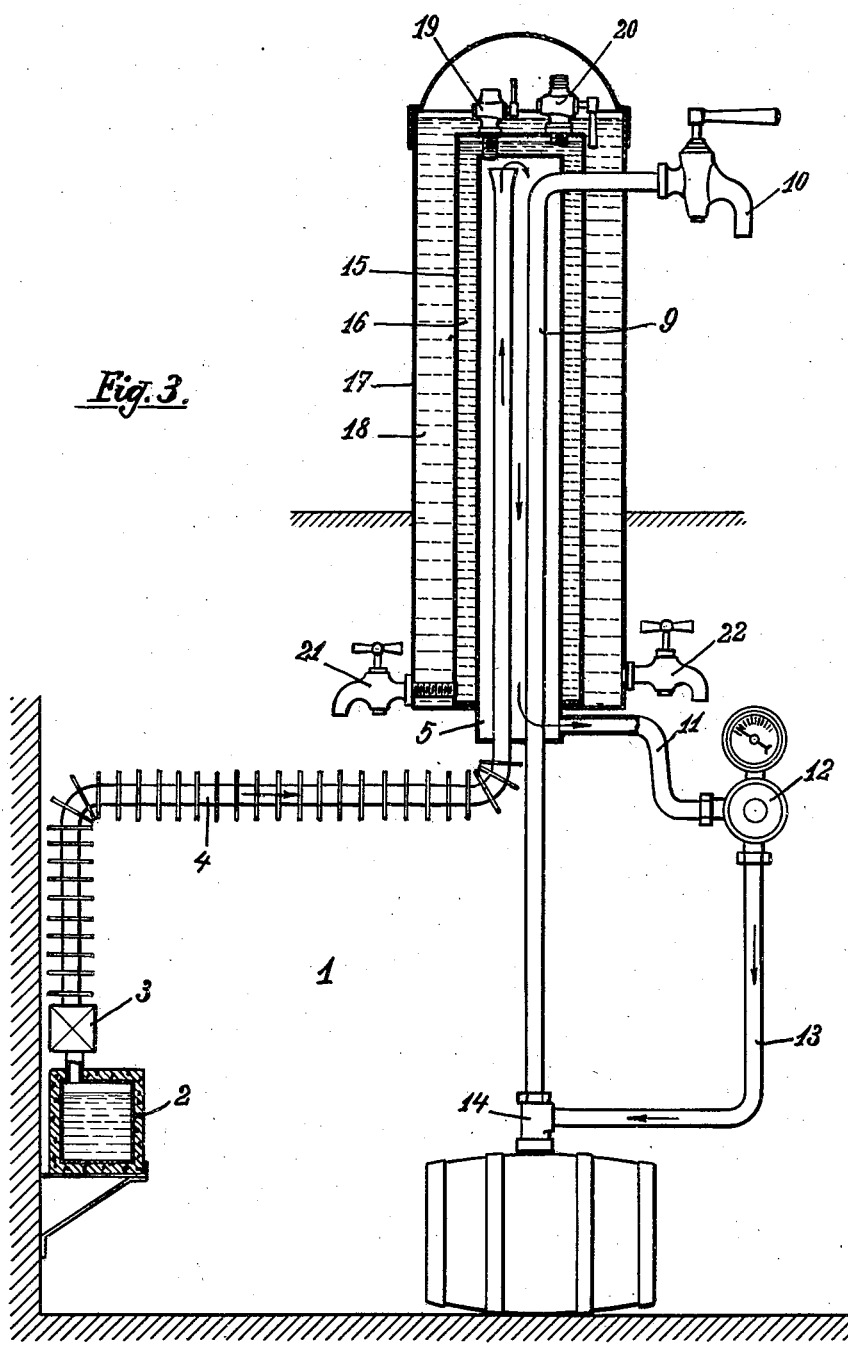
Fig. 3 is a vertical section of a modified form of construction.

Fig. 3 shows a modified form of construction by means of which the cooling effect can be considerably increased. For this purpose the cooling cylinder 5 is surrounded by a jacket 15 so that a space 16 is formed which is filled with cooling water.

Owing to the higher temperature in the cold storage room 1 the frozen carbon dioxide evaporates. The carbon dioxide thus evaporated rises through the pipe 4 and thus cools the cold storage room 1. The carbon dioxide escapes from the end of the pipe 4 into the cylinder 5. Owing to the sudden expansion of the carbon dioxide in the cylinder 5, the cooling effect is increased to such an extent that the water in the jacket 15 freezes forming a real ice jacket around the beer conduit sufficient to cool the beer to meet the most exigent requirements.

The jacket 15 is surrounded by another jacket 17, the internal space 18 of which is likewise filled with cooling water, and serves for protecting the ice jacket against the external heat. The cylinder 5 is provided with a cock 19 for the escapement of the carbon dioxide, whereas the jacket 15 is provided with a cock 20 for filling. Water drain taps 21 and 22 are connected to the inner jacket 15 and outer jacket 17 respectively.

The operation is as follows:—

The insulated receptacle 2 is filled with frozen carbon dioxide. The capacity of the receptacle 2 corresponds to that of a cylinder of liquid carbon dioxide.

The thermostat 3 closes and opens the passage between the cooling pipe 4 and the receptacle 2. As long as there is no cold carbon dioxide in the cooling pipe 4 and in the cooling cylinder 5 for the riser pipe the passage remains open. The frozen carbon dioxide in the insulated receptacle 2 comes into contact with the air which is of higher temperature than the frozen carbon dioxide. The result is, that the carbon dioxide commences to liquefy. The operation continues until the temperature, necessary for cooling the beer tapping plant or for cooling the cold storage room, is produced in the cooling pipe 4 and in the cooling cylinder 5 for the riser pipe. The thermostat 3 which is adjusted to this temperature then shuts off the passage. The space between the cooling water cylinder 7 and the cooling cylinder 5 for the riser pipe is filled with fresh water from the water supply main. The carbon dioxide present in the cooling pipe 4 and in the cylinder 5 comes first into contact with the outer walls until these are cooled to the same temperature. During this procedure the temperature of the carbon dioxide rises slightly with the result that it expands and produces a pressure in the cooling pipe 4 and in the carbon dioxide and beer conduit cylinder 5. The beer is forced up in the beer conduit by means of this pressure in known manner. The pressure regulation is effected in known manner by the pressure reducing valve 12. When a certain quantity of carbon dioxide has been used up owing to the consumption of the beer, the pressure again decreases and the temperature increases with the result that the thermostat again opens the passage so that liquid carbon dioxide with increased temperature again comes into contact with the frozen carbon dioxide. The above described operation then repeats itself.

The dry ice has a temperature of —80° C. This dry ice is therefore many times colder than natural or artificial ice.

We claim:—

1. An automatic cooling and pressure plant, comprising in combination a cold storage room, a beer conduit leading from said cold storage room, a receptacle containing dry ice consisting of frozen carbon dioxide, means for conducting the gaseous carbon dioxide liberated by the evaporation of the dry ice in said receptacle through said room around said beer conduit and to the lower end of said beer conduit to cool said storage room and said beer conduit and supply the gaseous carbon dioxide into said beer conduit as pressure medium.

2. An automatic cooling and pressure plant, comprising in combination a cold storage room, a beer conduit leading from said cold storage room, a receptacle provided with insulated walls, arranged in said cold storage room and adapted to accommodate the dry ice, a cooling pipe extending from said receptacle through said cold storage room adapted to conduct through said cold storage room the gaseous carbon dioxide liberated by the evaporation of the dry ice in said receptacle, a cylinder surrounding said beer conduit and the end of said cooling pipe, a jacket surrounding said cylinder adapted to be filled with cooling water to protect said cylinder from the external heat, and a branch pipe leading from the lower end of said cylinder to the lower end of said beer conduit adapted to conduct the gaseous carbon dioxide from said cylinder into said beer conduit.

3. An automatic cooling and pressure plant, comprising in combination a cold storage room, a beer conduit leading from said cold storage room, a receptacle provided with insulated walls arranged in said cold storage room and adapted to accommodate the dry ice, a cooling pipe extending from said receptacle through said cold storage room adapted to conduct through said cold storage room the gaseous carbon dioxide liberated by the evaporation of the dry ice in said receptacle, a thermostat arranged between said receptacle and said cooling pipe adapted to regulate the passage of the gaseous carbon dioxide in said cooling pipe according to the temperature prevailing in said cold storage room, a cylinder surrounding said beer conduit and the end of said cooling pipe, a jacket surrounding said cylinder adapted to be filled with cooling water to protect said cylinder from the external heat, and a branch pipe leading from the lower end of said cylinder to the lower end of said beer conduit adapted to conduct the gaseous carbon dioxide from said cylinder into said beer conduit to produce pressure in said beer conduit.

4. An automatic cooling and pressure plant, comprising in combination a cold storage room, a beer conduit leading from said cold storage room, a receptacle provided with insulated walls, arranged in said cold storage room and adapted to accommodate the dry ice, a cooling pipe extending from said receptacle through said cold storage room adapted to conduct through said cold storage room the gaseous carbon dioxide liberated by the evaporation of the dry ice in said receptacle, a cylinder surrounding said beer conduit and the end of said cooling pipe, a jacket surrounding said cylinder adapted to be filled with cooling water which freezes by the expansion of the gaseous carbon dioxide in said cylinder and forms an ice jacket surrounding said cylinder, and a branch pipe leading from the lower end of said cylinder to the lower end of said beer conduit adapted to conduct the gaseous carbon dioxide from said cylinder into said beer conduit.

5. An automatic cooling and pressure plant, comprising in combination a cold storage room, a beer conduit leading from said cold storage room, a receptacle provided with insulated walls, arranged in said cold storage room and adapted to accommodate the dry ice, a cooling pipe extending from said receptacle through said cold storage room adapted to conduct through said cold storage room the gaseous carbon dioxide liberated by the evaporation of the dry ice in said receptacle, a cylinder surrounding said beer conduit and the end of said cooling pipe, a jacket surrounding said cylinder adapted to be filled with cooling water which freezes by the expansion of the gaseous carbon dioxide in said cylinder and forms an ice jacket surrounding said cylinder, a second jacket surrounding said first jacket adapted to be filled with water to protect said ice jacket against the external heat.

GOTTFRIED FUCHS.
HERMANN SPÄTH.